Feb. 8, 1955 R. S. MARSDEN, JR., ET AL 2,701,832
MOISTURE-SENSITIVE ELEMENT
Filed Nov. 9, 1951

INVENTORS
R. S. MARSDEN, JR.,
D.R. DE BOISBLANC
BY
*Hudson & Young*
ATTORNEYS

United States Patent Office 2,701,832
Patented Feb. 8, 1955

2,701,832

MOISTURE-SENSITIVE ELEMENT

Ross S. Marsden, Jr., and Deslonde R. de Boisblanc, Bartlesville, Okla., assignors to Phillips Petroleum Company, a corporation of Delaware Application November 9, 1951, Serial No. 255,676

10 Claims. (Cl. 201—63)

This invention relates to the measurement of moisture content in a gas. In one embodiment this invention relates to an article of manufacture comprising a moisture-sensitive element having particular utility as a moisture detecting and measuring means.

Our invention is concerned with a specific type element which is sensitive to the presence of water vapor, inasmuch as its electrical resistance increases with an increase in the concentration of water vapor in its surrounding gas atmosphere, and decreases with a decrease in the said water vapor concentration.

An object of this invention is to provide a method for measuring the content of water vapor in a gas. Another object is to provide a moisture-sensitive element having special utility for measuring relative humidity. Another object is to provide as a new article of manufacture, a moisture-sensitive element, the electrical resistance of which is uniquely related to the presence of water vapor in its surrounding gas atmosphere. Other objects will be apparent to those skilled in the art from the accompanying disclosure and discussion.

In one embodiment, our invention provides for the detection and measurement of water vapor present in a gas, and for an element, as a new article of manufacture, having a resistance to the flow of electric current, which increases in response to an increase, and decreases in response to a decrease, in the concentration of water vapor in its surrounding gas atmosphere. The electrical resistor of our invention comprises a non-conductor such as quartz, plastic, glass, ceramic material, Bakelite, Lucite, Plexiglas, or the like, on the surface of which is applied a coating of colloidal graphite. The coating of colloidal graphite can be applied by painting the non-conductor, dipping it in a dispersion of the graphite and then permitting the coated product to dry, or spraying a colloidal dispersion of the colloidal graphite on the non-conductor, or the like. Although we generally prefer to apply the colloidal graphite as an aqueous dispersion, it can be applied as a dispersion in any suitable medium, as for example in a petroleum oil, glycerine, castor oil, mineral spirits, naphtha and other fluids.

Figure 1:
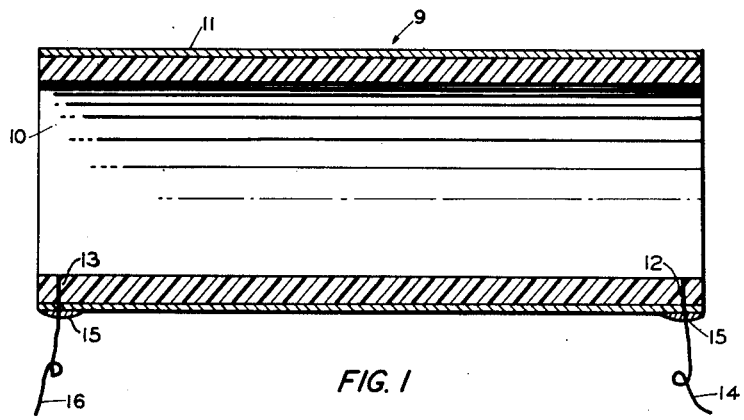
Figure 2:
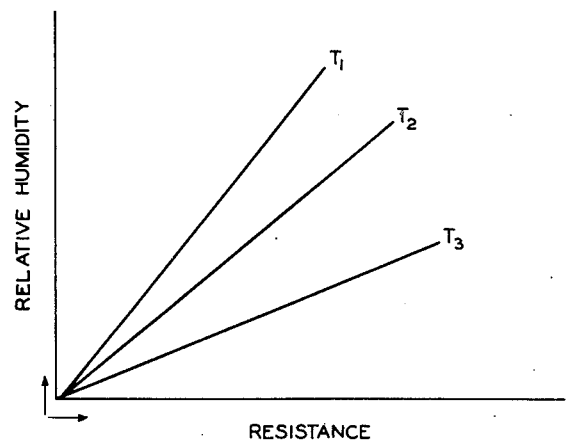

One form of the moisture-sensitive element of our invention and one embodiment of its manufacture are illustrated in Figure 1 of the accompanying drawings. It is to be understood that the accompanying drawings are diagrammatic only and that they can be altered in many respects by those skilled in the art and yet remain within the intended scope of our invention. Figure 2 is illustrative of a set of curves employed in one embodiment of our invention in which the moisture-sensitive element of the type illustrated in Figure 1 is used in the measurement of relative humidity.

Referring to Figure 1, plastic non-conductor tube 10 is softened at points 12 and 13 by heating, to permit insertion of conductor leads 14 and 16 into the tube 10 side wall. Upon permitting tube 10 to cool at these points, the leads 14 and 16 are firmly fixed thereto. Aqueous colloidal graphite is then brushed on to the plastic tube 10 (or rod if preferred) including the area around each of leads 14 and 16, and then dried to form colloidal graphite coating 11. It is important that electrical contact be maintained between conductor leads 14 and 16 and layer 11, which is generally effected as result of the drying described. However, a conductor seal, as for example, silver or aluminum paint 15, can be applied to coating 11 at each of the points of contact thereof with the leads 14 and 16 so as to insure electrical contact between the coating and each of the leads. In order to maintain maximum moisture-sensitivity it is necessary that leads 14 and 16 be disposed at opposite ends of tube or rod 10.

The thickness of coating 11 is generally in the order of about 0.010", although, when desired, coating 11 can be any desired thickness, such as from 0.005" to 0.025".

The change in resistance of our moisture-sensitive element as a function of a change in content of water vapor in the surrounding gas atmosphere, described above, is contrary to the teachings of the art; that resistance being normally expected to decrease in response to an increase, and to increase in response to a decrease in water vapor content of the surrounding gas.

In the manufacture of element 9, any suitable sealing cement can be employed in affixing leads 14 and 16 to the element 10, when desired. This is particularly advantageous when the element 10 is fabricated of materials such as glass, ceramics, or the like.

In the operation of the resistance element 9 of Figure 1, leads 14 and 16 are connected with any conventional type resistance measuring device such as a simple ohm meter.

One form of utilization of element 9 resides in the measurement of relative humidity. In that application, the resistance to the flow of electric current of resistor element 9 suspended in the air atmosphere increases in response to an increase, and decreases in response to a decrease in the relative humidity, and has a specific resistance at a given temperature and relative humidity. As for example with reference to the curves $T_1$, $T_2$ and $T_3$ and as many additional such curves as desired, derived by a plot of resistance of the element 9 versus relative humidity, at a given temperature level, it is only necessary to read the resistance across element 9 and to read the temperature of the surrounding atmosphere and then refer to the set of curves of Figure 2 for a direct reading of the relative humidity. By way of example, the resistance at 78° F. across a cylindrical resistor element 9 of Figure 1, 3" long and ¼" in diameter and having a coating 11 0.010 inches thick was respectively 498.3, 573.7 and 764.0 ohms at relative humidities of 0.0, 59 and 100.

Many modifications of this invention will be apparent to those skilled in the art upon study of the accompanying disclosure. Such modifications, being clearly apparent from this disclosure are believed to be within the spirit and scope of this invention.

We claim:

1. A moisture-sensitive element as an article of manufacture, comprising a non-hygroscopic insulating support member, a coating of colloidal graphite on a surface of said support member, and conductor leads affixed in contact with said coating at separate points thereon.

2. An article of claim 1 wherein each said lead is separately sealed to said coating by a conductor-seal.

3. An article of claim 1 wherein said support member is cylindrical and wherein one single conductor lead is maintained in contact with said coating at a point in close proximity to one end of said cylindrical support member and another single conductor lead is maintained in contact with said coating at a point in close proximity to the other end of said cylindrical support member.

4. The article of claim 1 wherein said support member is a tube.

5. The article of claim 1 wherein said support member is a rod.

6. The article of claim 4 wherein said support member is a plastic substance.

7. A moisture-sensitive element as an article of manufacture, comprising a non-conductor, a coating of colloidal graphite on a surface of said non-conductor and conductor leads sealed, in contact with said coating, with aluminum at separate points thereon.

8. A moisture-sensitive element as an article of manufacture comprising a non-hygroscopic insulating support member, a coating of colloidal graphite on a surface of said support member, and conductor leads sealed in contact with said coating by metal seals at separate points thereon.

9. The article of claim 8 wherein said metal seal is silver.

10. A moisture-sensitive element as an article of manufacture, comprising a non-hygroscopic insulating support member, a coating of colloidal graphite on a surface of said support member, having a thickness of from 0.005 to 0.025 inches, and conductor leads affixed to said support member at separate points in contact with said coating.

References Cited in the file of this patent

UNITED STATES PATENTS

| | | |
|---|---|---|
| 2,285,421 | Dunmore | June 9, 1942 |
| 2,358,406 | Lightgarn | Sept. 19, 1944 |
| 2,416,599 | Victoreen | Feb. 25, 1947 |
| 2,469,736 | McBrayer | May 11, 1949 |
| 2,493,745 | Blodgett et al. | Jan. 10, 1950 |
| 2,526,636 | Colman | Oct. 24, 1950 |
| 2,609,688 | Larach | Sept. 9, 1952 |